UNITED STATES PATENT OFFICE.

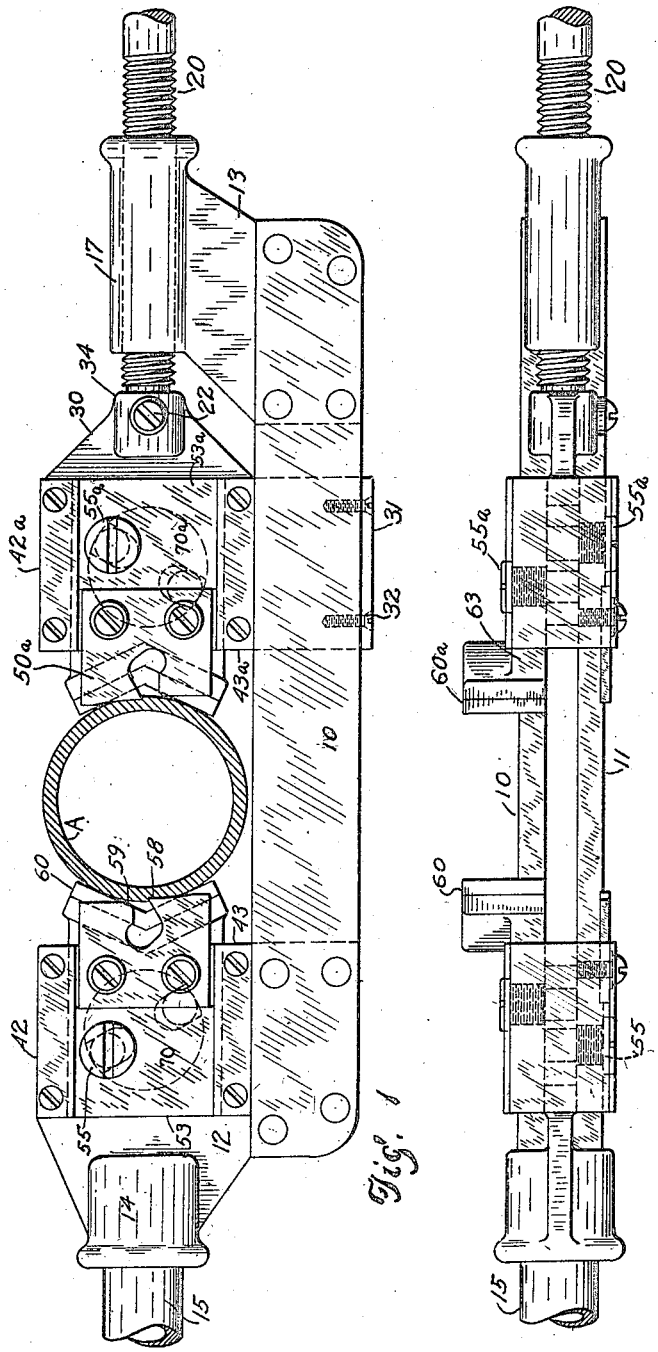

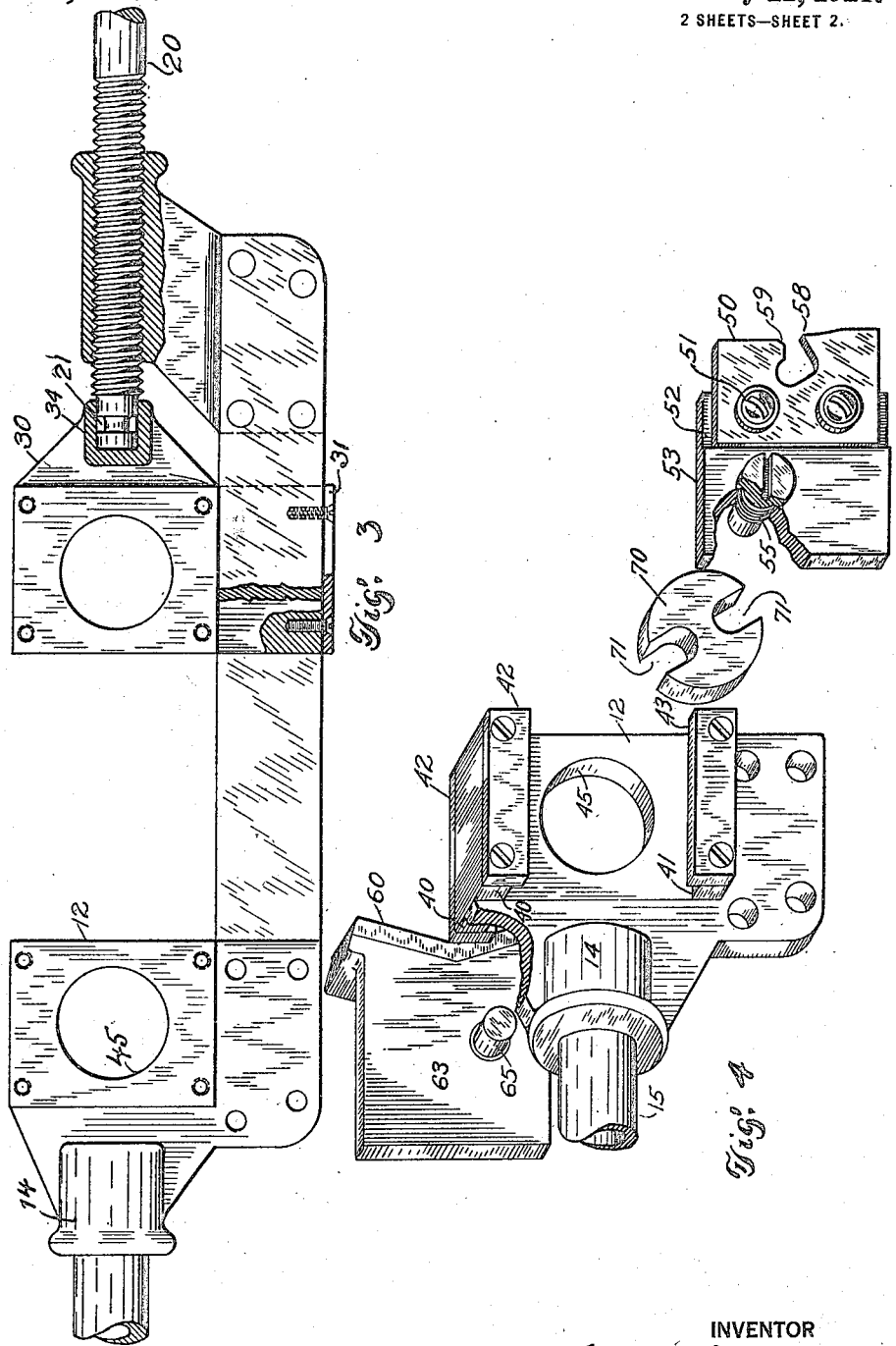

IRA W. NONNEMAN, OF WARREN, OHIO, ASSIGNOR TO THE BORDEN COMPANY, OF WARREN, OHIO, A CORPORATION OF OHIO.

PIPE-CUTTER.

1,384,208.

Specification of Letters Patent.     Patented July 12, 1921.

Application filed February 9, 1920. Serial No. 357,237.

*To all whom it may concern:*

Be it known that I, IRA W. NONNEMAN, a citizen of the United States, residing at Warren, in the county of Trumbull and State of Ohio, have invented a certain new and useful Improvement in Pipe-Cutters, of which the following is a full, clear, and exact description, reference being had to the accompanying drawings.
The object of this invention is to provide a simple and inexpensive pipe cutter adapted to operate efficiently notwithstanding irregularities or inaccuracies in the surface of the pipe. The cutter is of that type shown in my prior Patent #1,076,223 wherein there is a cutting knife and a pipe guide mutually connected by an equalizing lever, so that a surface obstruction met by the guide as the tool travels is compensated for by a deeper cut of the knife. There may conveniently be two of these equalized units on opposite sides of the pipe, one of them being shiftable toward and from the other for different sized pipe and also to effect the feeding.
The particular object of the present invention is to strengthen and render more efficient, and at the same time simplify, the equalizing connection between each guide and its knife, and the invention comprises the means by which this is accomplished, as hereinafter more fully explained and as summarized in the claims.

In the drawings Figure 1 is a side elevation of my pipe cutter; Fig. 2 is an edge view thereof; Fig. 3 is a sectional side elevation of the frame and means for carrying and moving the movable unit; Fig. 4 is a telescopic perspective illustrating the various parts comprising the equalizing unit.
As shown in Figs. 1, 2 and 3, the frame of the pipe cutter comprises two longitudinal bars 10 and 11 parallel with each other and spaced apart and riveted or otherwise secured to stationary blocks 12 and 13, which extend between the bars at their opposite ends. The block 12 carries one of the guiding and cutting units hereinafter described and also has a socket 14 into which an operating handle 15 extends. The block 13 carries an internally threaded sleeve 17 in which is mounted a screw 20 operating the other guiding and cutting unit and serving also as a handle on that side.

Slidably mounted between the bars 10 and 11 is a block 30 which carries the traveling cutting and guiding unit. This block has secured to its outer edge a suitable strip 31, which may be readily fastened by screws 32 and extends across the bars 10 and 11 to hold the block in place; the block having shoulders hereinafter mentioned slidably engaging the inner edges of the bars. On this block 30 is a socket 34 in which the inner end of the screw 20 is swiveled; as shown the screw has an annular groove 21 into which extends a set screw 22 threaded in the socket wall.

The stationary block 12 and the movable block 30 carry their guiding and cutting units in substantially the same manner. The block 12 and its coöperating parts are shown specifically in Fig. 4, where it will be seen that this block has ribs 40 on its opposite sides at the outer edges, and ribs 41, also on its opposite sides, in position to bear against the inner edges of the bars 10 and 11. Secured to the four ribs mentioned, are four gibs 42 and 43 which overhang the ribs toward the intermediate portion of the block. I have thus provided undercut ways on opposite sides of the block for slidably holding and guiding the knife carrier and pipe guide respectively.

The knife is designated 50. It is secured by screws 51 in a rabbeted edge 52 of a block or carrier 53, which slides in the ways on one side of the block 12; the pipe guide 60 is secured to or formed integral with, a plate-like portion 63, which I call a guide-carrier and which slides in the ways on the other side of the plate 12. In the plate 12 is a circular opening 45 of considerable diameter, and occupying this opening freely enough to readily turn therein is a disk 70 which is of only slightly less thickness than the block 12. In this disk are diametrically opposed notches 71. The knife block 53 carries a screw pin 55 which is threaded into it, and has a smooth cylindrical inwardly projecting portion occupying one of the notches 71. The guide block 63 carries a similar screw pin 65 which engages the other notch 71.

It will be seen that the notched disk 70 constitutes an equalizing lever connecting the knife carrier and guide carrier so that when either is pressed toward the handle 15 the other is automatically shoved toward the pipe.

The cutting unit on the movable block 30 is identical to that described for the stationary block 12; in other words, there is a knife 50ª carried by sliding block 53ª and a pipe guide 60ª having a shank block 63ª, and these blocks 53ª and 63ª carry the screw pins 55ª and 65ª which engage diametric notches in disk 70ª mounted in a circular opening in a plate 30.

The guides for the inner and outer edges of the knife block and the guide block of the traveling unit are the same as described for the stationary end. It may be noted however, that the ribs corresponding to the ribs 41 which carry gibs 43ª (Fig. 1) provide shoulders engaging the inner edges of the frame bars 10 and 11; these shoulders, together with the plate 31 heretofore mentioned, serve to slidably guide the movable head 30 along the frame bars.

In Fig. 1, I have shown at A, a pipe being cut. In operation the screw 20 is turned to cause the knives and guides to engage this pipe then the tool is rotated as a unit about the axis of the pipe; the screw being gradually turned as the cutting proceeds to feed the knives farther and farther into the pipe. The knives are preferably of that type which have in addition to their cutting points 58, opposed limiting shoulders 59. In the ordinary operation the shoulder 59 is out of engagement with the pipe; now if the guide meets an obstruction on the pipe, as frequently happens due to the irregularities of the pipe surface, it simply gives back slightly and the knife point takes a correspondingly deeper cut into the pipe. The knife however, cannot go too deeply into the pipe, or "hog" it, as it is called, on account of the limiting shoulder on the knife; any such abnormal obstruction on the pipe as would tend to cause this is taken care of by loosening the feed screw 20.

It will be seen that my equalizing connection between the knives and guides is of simple construction and does not increase the size of the tool. At the same time it possesses the desired strength to receive and transmit the strains to which it is subjected.

I claim:

1. In a pipe cutter, the combination of a guide carrier, a knife carrier and intermediate member slidably supporting them, a rocking member carried by the intermediate member and adapted to turn about an axis extending across the knife carrier and guide carrier, and means connecting the rocking member with the knife carrier and guide carrier on opposite sides of the rocking axis.

2. In a pipe cutter, the combination with a supporting member, a rocking member mounted thereon and adapted to swing in the general plane of the supporting member, a guide carrier slidably mounted on one side of the supporting member, a knife carrier slidably mounted on the other side of the supporting member, and pins connecting the rocking member on opposite sides of its rocking axis with the guide carrier and knife carrier respectively.

3. In a pipe cutter, the combination with a supporting member having a recess, a rocking member mounted in said recess and adapted to swing in the general plane of the supporting member, a guide carrier slidably mounted on one side of the supporting member, a knife carrier slidably mounted on the other side of the supporting member, said carriers serving to retain the rocking member in place, and pins connecting the rocking member on opposite sides of its rocking axis with the guide carrier and knife carrier respectively.

4. In a pipe cutter, the combination of a supporting block having a recess, a rocker mounted in said recess, a guide carrier and a knife carrier slidably mounted on opposite sides of the supporting block, and pins connecting the rocker with the guide carrier and knife carrier respectively, said pins being each supported by one of the members and extending into elongated openings in the other.

5. In a pipe cutter, the combination of a supporting block having a recess, a rocking block mounted in said recess and having diametrically opposed elongated openings therein, a guide carrier and a knife carrier slidably mounted on opposite sides of the supporting member, and pins carried by the guide carrier and knife carrier respectively and extending into the elongated openings in the rocking member.

6. In a pipe cutting tool, the combination with a supporting member of a knife carrier, a guide carrier, a notched rocking member carried by the supporting member, and pins carried by the guide carrier and the knife carrier respectively engaging the notches of said rocking member.

7. In a pipe cutter, the combination of the supporting block having a circular recess therein, a disk occupying said recess and having a plurality of notches therein, a guide carrier slidable on one side of the block, a knife carrier slidable on the other side of the block, and pins connecting the disk with the guide carrier and knife carrier respectively, said pins being rigidly carried at one end by said guide carrier and knife carrier respectively and occupying notches at the other end.

8. In a pipe cutter, the combination of the supporting block having a circular recess therein, a disk occupying said recess, and having radial notches, a guide carrier slidable on one side of the block, a knife carrier slidable on the other side of the block, and pins screw threaded in the guide carrier and knife carrier respectively and having their inner ends occupying said notches.

9. In a pipe cutter, the combination of a supporting block, having a recess, a rocking member mounted in said recess, a guide-carrying member and a knife-carrying member mounted on said supporting block, and inter-engaging connections between the rocking member and the guide-carrying member and between the rocking member and the knife-carrying member respectively, said inter-engaging connections being on opposite sides of the center of oscillation of the rocking member and each comprising a pin supported by one of said members and extending into an elongated opening in the coöperating member, whereby movement of the guide-carrying member in one direction produces a movement of the knife-carrying member in the opposite direction.

10. In a pipe cutter, the combination of a block having parallel sides, and having a circular opening through it, a guide carrier slidably guided against the face of the block on one side of the opening, a knife carrier slidably guided on the other face of the block opposite said opening, a disk mounted in the opening and having its periphery freely engaging the peripheral wall of the opening and its sides adapted to freely abut the knife carrier and guide carrier, said disk having diametrically opposed elongated openings and pins rigidly mounted in the guide carrier and knife carrier respectively, and operating in said elongated opening.

In testimony whereof, I hereunto affix my signature.

IRA W. NONNEMAN.